(12) United States Patent
Statnikov

(10) Patent No.: US 6,289,736 B1
(45) Date of Patent: Sep. 18, 2001

(54) MEANS AND METHOD FOR ELECTROACOUSTIC TRANSDUCER EXCITATION

(75) Inventor: Efim Shmulevitch Statnikov, Severodvinsk (RU)

(73) Assignee: UIT, L.L.C. Company, Birmingham, AL (US)

( * ) Notice: Subject to any disclaimer, the term of this patent is extended or adjusted under 35 U.S.C. 154(b) by 0 days.

(21) Appl. No.: 09/273,769

(22) Filed: Mar. 23, 1999

(30) Foreign Application Priority Data

Mar. 23, 1998 (WO) .................. PCT/RU98/00082
Mar. 23, 1998 (WO) .................. PCT/RU98/00083

(51) Int. Cl.[7] ................ G01M 1/14; G01M 7/00
(52) U.S. Cl. ................ 73/579; 73/1.82; 73/12.01
(58) Field of Search .................. 73/579, 573, 54.25, 73/54.24, 582, 584, 1.82, 1.86, 12.01

(56) References Cited

U.S. PATENT DOCUMENTS

| | | | |
|---|---|---|---|
| 3,918,442 | * 11/1975 | Nikolaev et al. | 606/53 |
| 4,973,876 | * 11/1990 | Roberts | 310/316 |
| 5,766,137 | * 6/1998 | Omata | 73/573 |
| 6,036,796 | * 3/2000 | Halbert et al. | 156/64 |
| 6,171,415 | * 1/2001 | Statnikov | 148/525 |

* cited by examiner

Primary Examiner—Hezron Williams
Assistant Examiner—Jacques Saint-Surin
(74) Attorney, Agent, or Firm—Breiner & Breiner, L.L.C.

(57) ABSTRACT

The invention relates to ultrasonic welding methods and apparatus for correcting the difference of frequency and phase of transducer mechanical oscillations and oscillator driving impulses to the transducer under conditions of discontinuous loading, thereby to increase the efficiency of the transducer excitation. The transducer excitation impulses are periodically supplied to the transducer at a length not more than a half-period of the transducer mechanical oscillations, and after termination are resumed again with adjustment phase and frequency determined by transducer striction feedback signals. A zero-crossing detector applies the resumed and adjusted phase and frequency driving impulses, thereby corresponding to the highest transducer sensitivity. Feedback impulses established by the transducer mechanical resonance characteristics under varying load control the phase and frequency of the excitation pulses.

6 Claims, 1 Drawing Sheet

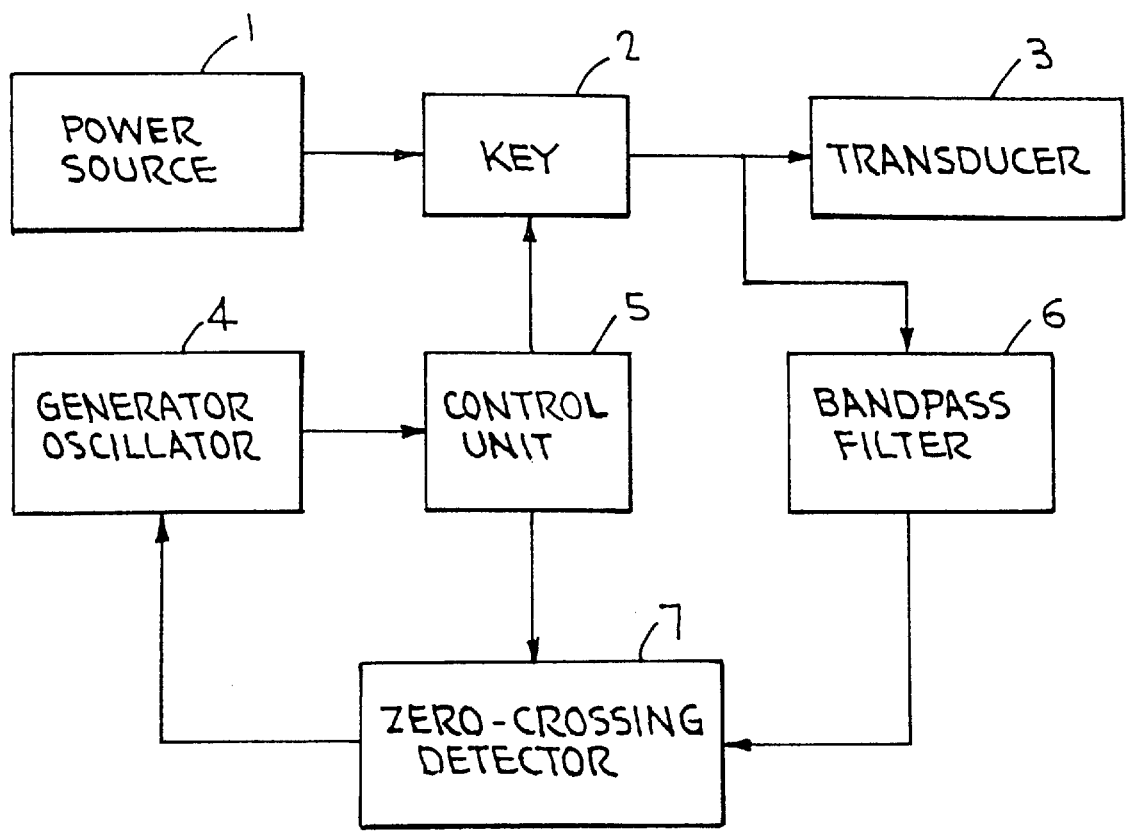

MEANS AND METHOD FOR ELECTROACOUSTIC TRANSDUCER EXCITATION

FIELD OF THE INVENTION

The present invention is concerned with the ultrasonic technology and can be adapted for various uses, more particularly for technological processes employed by machine building, shipbuilding, and bridge engineering for production of welded structures, especially those operating on the ultimate stress limit, as well as for relaxation strengthening of welded structures.

DESCRIPTION OF THE PRIOR ART

Known is the method for Ultrasonic Impact Treatment (UIT) with automatic adjustment of resonant oscillation system power source frequency. Minimization of power consumed and automatic control over the required quality of ultrasonic treatment of welded structures and other objects are provided through processing of a return signal. A control parameter is the amplitude of the return signal, which is proportional to that of electromechanical transducer output mechanical oscillations. The level of the latter is maintained within the range of the preset critical values through the voltage pulse-width modulation at a carrier resonant frequency of an oscillation system under load (e.g. RF(RU) patent [1]2031144, Int. Cl.6 C21D 1/04, 11/00 of May 11, 1990).

This method for electroacoustic transducer excitation is inefficient with discontinuous load and susceptible to external influences upon the amplitude of transducer ultrasonic displacements.

The most close technical solution to that described above is the method for electroacoustic transducer excitation at discontinuous load, which lies in that the excitation electric impulses are supplied to the transducer at resonant frequency or frequency multiple of the resonant one, while impulse length is not more than a half-period of transducer mechanical oscillations. The supply of impulses is periodically terminated and then, in response to a return striction signal, is resumed again at an adjusted frequency (see, for example, author's certificate of the USSR No. 1271585, A 06A 1/06 of 1986). The current impulses are supplied to the transducer synchronously with the oscillations in a electric circuit formed by the transducer and the compensator.

The deficiency of this method is that the frequency of electric resonance in the circuit formed by the concatenated transducer and compensator differs from transducer intrinsic mechanical oscillation frequency due to influence of various external factors such as load, temperature, viscosity, etc. The transducer efficiency coefficient at electric circuit resonant frequency is considerably reduced with the increase in difference of frequencies of the transducer mechanical oscillations and resonant oscillations of electric circuit.

SUMMARY OF THE INVENTION

The method aims to solve the problem of efficient excitation of the oscillation system at its resonant frequency under conditions of discontinuous load. The method lies in that the excitation electric impulses are supplied to the transducer at resonant frequency or frequency multiple of the resonant one, while impulse length is not more than a half-period of transducer mechanical oscillations. The supply of impulses is periodically terminated and then, in response to a return striction signal, is resumed again at an adjusted frequency.

The method is distinguished in that the supply of excitation impulses is resumed at the time corresponding to the highest transducer sensitivity at frequency and in oscillation phase adjusted to those of the transducer at this time.

The invention enhances the efficiency of the transducer excitation and reduces the influence of external factors upon the change of ultimate amplitude of its ultrasonic displacement in the course of operation under load. This allows for significant widening of the range of applications of the UIT method, automating the selection of optimal treatment modes to achieve the required quality of a surface treated depending on its plastic deformation conditions, and for lowering power consumption.

For the reason that the combination of essential features of the method, described in the method claim, is currently unknown, this invention conforms with novelty criterion (N). Since no technical solutions are identified to have the features matching the distinctive features of the present invention, it is deemed to conform with the invention level criterion (IS). The reasons stated below in the Paragraph on Industrial Applicability prove that the invention conforms with industrial applicability criterion (IA).

BRIEF DESCRIPTION OF FIG. 1

The FIGURE schematically presents one of the preferred embodiments of the method for ultrasonic transducer excitation.

DESCRIPTION OF THE PREFERRED EMBODIMENT

The preferred version of the method embodiment fully describes the method but does not exclude its other versions. The transducer excitation impulses are supplied at the frequency of mechanical resonance of the transducer under load or frequency multiple of the resonant one synchronously with a return striction signal in the phase of the highest sensitivity of the loaded oscillation system. The synchronization of excitation impulses with a return striction signal is performed in such a way that the impulses are supplied to the transducer in those moments of time, which provide for maximum values of ultrasonic displacement amplitude at varying load.

The essence of the method is illustrated by the device for its implementation which is schematically figured below and includes a power source (1), a key (2), a transducer (3), a generator (4) with an option of automatic frequency and phase adjustment, a control unit (5), a band-pass filter (6), and a zero-crossing detector (7) having an operation enable input. The key control signal is formed in the control unit (5), the input of which is supplied with signals of a generator (4) with the automatic frequency and phase adjustment option. With key closure, the current impulses of not more than half-period of transducer (3) mechanical oscillations in length are transferred from a power source (1) to a transducer (3) and excite mechanical oscillations at transducer's own frequency. Return striction signal (voltage) is formed on transducer clamps, induced by transducer mechanical oscillations. When either load or any other external factors change, the transducer intrinsic frequency of mechanical oscillations changes as well, and, so does the frequency of the return striction signal. The voltage goes from the transducer (3) through the band-pass filer (6) to the zero-crossing detector (7). The zero-crossing detector has an operation enable (disable) option. An operation enable signal of the zero-crossing detector is formed in the control unit to eliminate the appearance of impulses, induced by the key operations, at the output of the detector. A signal from the zero-crossing detector output goes to the input of the generator which automatically adjusts the frequency of the output signal, so that the phase difference between its output signal and the zero-crossing detector impulses is kept as required. The control unit forms a key control signal and an operation enable signal for the zero-crossing detector. In doing so, the frequency of the output signal produced by the generator with an option of automatic frequency and phase adjustment can be either multiple of or equal to the frequency of impulses produced by the zero-crossing detector.

The method can use either a magnetostriction or a piezoelectric transducer.

Industrial Applicability

The proposed method is industrially applicable as it considerably improves the ultrasonic impact treatment technology and equipment. The UIT method and equipment have been tested and certified (according to the Eurocode) by the International Welding Institute, the Institute of Welding in France, and are currently being considered for inclusion in the ISO standards.

What is claimed is:

1. A method of driving a loaded electroacoustic transducer at discontinuous intervals with electric excitation impulses supplied to the transducer at one of a determined resonant frequency or frequency multiple thereof to induce mechanical oscillations of the transducer for impacting a work interface presenting variable loading factors while confining duration of said impulses to not more than half a period of said mechanical oscillations, wherein the excitation impulses are discontinuously interrupted while the transducer is impacting said work interface, comprising the steps of:

attaining a feedback voltage from the driven transducer when impacting said work interface representative of the displacement of the transducer and its intrinsic mechanical oscillation frequency and phase, resuming the excitation impulses after interruptions at a phase corresponding to the highest loaded transducer sensitivity providing for maximum values of ultrasonic displacement amplitude at varying loads, and adjusting the oscillator frequency and phase at the resumption of the excitation impulses to match the frequency and phase exhibited by the intrinsic mechanical oscillation frequency of the driven transducer at the resumption time.

2. The method of claim 1 further comprising the step of terminating the excitation impulses at a zero-crossing point of the transducer oscillation frequency.

3. The method of claim 1 further comprising the step of periodically terminating the excitation impulses.

4. A system of driving a loaded electroacoustic transducer at discontinuous intervals with electric excitation impulses supplied to the transducer at one of a determined resonant frequency or frequency multiple thereof to induce mechanical oscillations of the transducer for impacting a work interface presenting variable loading factors while confining duration of said impulses to not more than half a period of said mechanical oscillations, wherein the excitation impulses are discontinuously interrupted while the transducer is impacting said work interface, comprising:

means for attaining a feedback voltage from the driven transducer when impacting said work interface representative of the displacement of the transducer and its intrinsic mechanical oscillation frequency and phase, an oscillator for timing the excitation impulses, control means for interrupting the excitation impulses and resuming the excitation impulses after interruptions at a phase corresponding to the highest loaded transducer sensitivity providing for maximum values of ultrasonic displacement amplitude at varying loads, and means for adjusting the oscillator frequency and phase at the resumption of the excitation impulses to match the frequency and phase exhibited by the intrinsic mechanical oscillation frequency of the driven transducer at the resumption time.

5. The system of claim 4 further comprising means for terminating the excitation impulses at a zero-crossing point of the transducer oscillating frequency.

6. The system of claim 4 further comprising means for periodically terminating the excitation impulses.

* * * * *